United States Patent [19]
Scheuer

[11] Patent Number: 5,903,227
[45] Date of Patent: May 11, 1999

[54] REMOTE CHANNEL SWAP FOR AVIATION COMMUNICATIONS

[76] Inventor: Mark S. Scheuer, 12636 Red Fox Dr., Knoxville, Tenn. 37922

[21] Appl. No.: 08/641,498

[22] Filed: Apr. 30, 1996

[51] Int. Cl.$^6$ .................................................... G08B 21/00
[52] U.S. Cl. .................... 340/945; 340/946; 340/981; 342/46; 381/86; 381/92; 455/186.1; 455/186.2; 455/166.1; 455/166.2; 455/78; 455/73; 455/528; 701/200
[58] Field of Search .................................. 340/945, 946, 340/981; 342/404, 46, 451, 49; 381/74, 81, 86, 92, 122; 455/186.2, 186.1, 166.2, 166.1, 38.2, 78, 58.2, 83, 89, 55.1, 528, 73; 701/200, 218

[56] References Cited

U.S. PATENT DOCUMENTS

| | | | |
|---|---|---|---|
| 3,760,278 | 9/1973 | Narbaits-Jaureguy et al. | 455/55.1 |
| 4,367,559 | 1/1983 | Tults | 455/186.2 |
| 4,551,854 | 11/1985 | Rutty et al. | 455/78 |
| 4,672,214 | 6/1987 | Takahashi et al. | 250/551 |
| 4,843,399 | 6/1989 | Bongiorno et al. | 342/404 |
| 4,932,071 | 6/1990 | Arndt et al. | 455/38.2 |
| 4,941,187 | 7/1990 | Slater | 381/86 |

OTHER PUBLICATIONS

Narco Avionics, Inc. performance specification for CP 136M Audio Control Panel, printed Jul. 1992, 2 pages.
TERRA Corporation specification for Audio Panel TERRA TMA 350 D, 2 pages.
Allied Signal Inc. specification for KMA 24/24H, 1988, 4 pages.

Primary Examiner—Benjamin C. Lee
Attorney, Agent, or Firm—Conley, Rose & Tayon, PC; B. Noel Kivlin

[57] ABSTRACT

A device and method that allows a pilot to switch between communication and navigation inputs without disrupting the pilot's current task. An audio selector panel has inputs for at least two communication transceivers and outputs for at least a pilot's headset. A rotary switch on the face of the audio selector panel selects which inputs are connected to which outputs. The audio selector panel further includes a remote swap switch that is mounted in a position in which the pilot can activate the switch without removing his/her hands from a yoke or diverting his/her eyes to the switch. The activation of the remote swap switch causes the audio selector panel to switch between the communication and navigation inputs. In this way, the pilot can switch communication and navigation inputs without disrupting the current task of the pilot.

39 Claims, 3 Drawing Sheets

REMOTE CHANNEL SWAP FOR AVIATION COMMUNICATIONS

FIELD OF THE INVENTION

This invention relates to aviation communication systems and more particularly to an aviation audio selector panel.

DESCRIPTION OF THE RELATED ART

Audio selector panels are devices that interconnect communication and navigation equipment with the pilot, copilot and passengers. For example, an audio selector panel may interconnect communication transceivers (COM), radio telephone transceivers (TEL), distance measuring equipment (DME), marker beacon receivers (MKR), automatic direction finders (ADF), and navigation receivers (NAV) with the pilot's headset, the copilot's headset, the passengers' headsets, and the plane's intercom system. The audio selector panel allows the pilot/copilot to select which communication and navigation equipment is monitored by which crew members and passengers.

Conventional audio selector panels have inputs for at least two communications transceivers. Communication transceivers are radios used to communicate with the traffic controllers, ground crews or other planes. Pilots/copilots use audio selector panels to select which communication device, or other input, is monitored. In conventional audio selector panels, switching between communication transceivers, or other inputs, is accomplished by manually activating a switch on the face of the audio selector panel. The audio selector panel is typically mounted in the plane's console between the pilot and copilot.

It is necessary for the pilot/copilot to switch between communication transceivers during the course of take-off, flight and landing. Often it is necessary to switch between communication transceivers at critical times during the flight when it is undesirable or inconvenient for the pilot/copilot to remove his/her hands from the yoke and divert his eyes to the audio selector panel.

For example, on take-off, the pilot may have one communication transceiver (COM1) tuned for the frequency of the Tower and another communication transceiver 2 (COM2) tuned for the frequency for Departure. After the pilot departs the runway and is requested to contact Departure, he/she must remove a hand from the yoke, divert his/her eyes to the audio selector panel, and turn a switch on the audio selector panel from COM1 to COM2. This process distracts the pilot's attention from the task of controlling the plane, is inconvenient for the pilot, and is dangerous in some situations. It would be desirable to allow the pilot to switch between communication transceivers, or other communication/navigation devices, without having to take his/her hands off the yoke or divert his/her eyes to the audio selector panel.

SUMMARY OF THE INVENTION

The problems outlined above are in large part solved by a an audio selector panel with a remote switch that allows the pilot to switch between communication transceivers, or other communication/navigation devices, without removing his/her hands from a flight control mechanism. In one embodiment, a momentary switch, called a remote swap switch, is attached to the yoke in a position where the pilot can reach the switch without removing his/her hands from the yoke. The remote swap switch is connected to the audio selector panel, via wire or other suitable means, and causes the audio selector panel to switch between two communication transceivers. For example, if COM1 is selected when the remote swap switch is activated, the audio selector panel will select COM2. In a similar manner, if COM2 is selected when the remote swap switch is activated, the audio selector panel will select COM1. The selection of COM1 or COM2 causes the audio selector panel to connect at least the pilot's headset to the selected communication transceiver.

A visual an indicator may further be provided upon the audio selector panel that indicates if a manual switch on the face of the audio selector panel does not accurately reflect the selected device. More specifically, if the audio selector panel has a manual switch for selecting the input device, when the remote swap switch is activated the manual switch may not accurately reflect which input device is selected. For example, COM1 may be selected by the manual switch on the face of the audio selector panel. When the remote swap switch is activated, COM2 will be selected, but the manual switch will still indicate that COM1 is selected. To warn the pilot of this condition, a "swap" indicator is included on the audio selector panel.

The audio selector panel may further be capable of connecting the pilot's headset to one input device while the copilot's headset is connected to another input device. For example, the pilot may be connected to COM1 and the copilot may be connected to COM2. When the remote swap switch is activated in this mode, the pilot and copilot's input devices are exchanged. Using the above example, activating the remote swap switch would switch the pilot from COM1 to COM2 and switch the copilot from COM2 to COM1.

BRIEF DESCRIPTION OF THE DRAWINGS

Other objects and advantages of the invention will become apparent upon reading the following detailed description and upon reference to the accompanying drawings in which.

Figure 1:
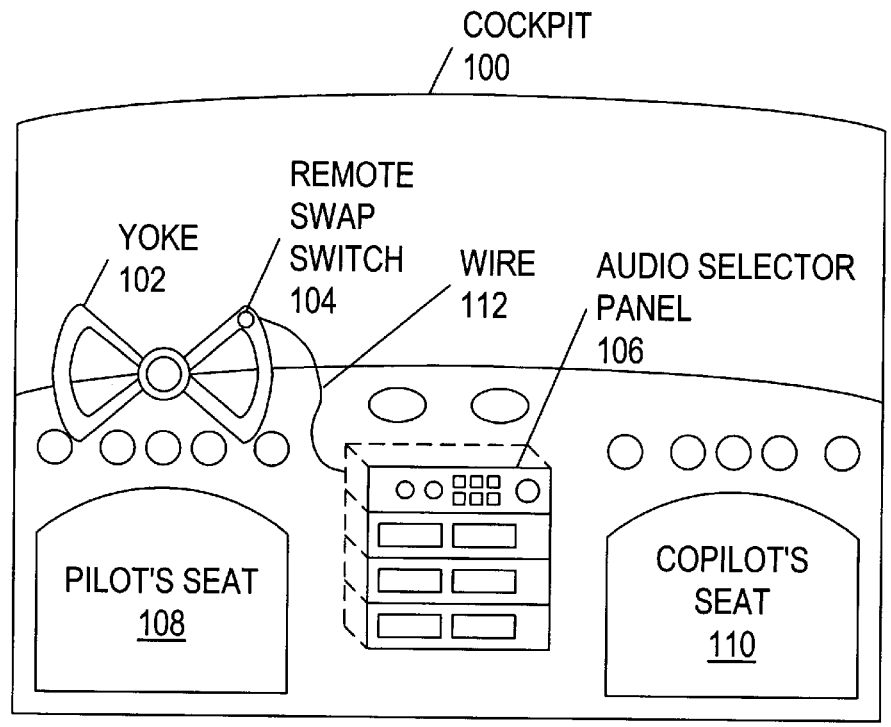
FIG. 1 is a diagram of a cockpit in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a diagram of a cockpit 100 including a yoke 102, a remote swap switch 104, an audio selector panel 106, a pilot's seat 108, a copilot's seat 110, and a wire 112 that connects remote swap switch 104 to audio selector panel 106.

Yoke 102 is a conventional yoke that includes remote swap switch 104. Remote swap switch 104 is preferably mounted on yoke 102 in such a position that remote swap switch 104 can be activated without a pilot removing his/her hands from yoke 102. Remote swap switch 104 is also preferably located on yoke 102 such that it can be activated by a pilot without diverting his/her eyes to the switch. In this manner, remote swap switch 104 can be activated without disrupting and distracting the pilot from his current task.

Remote swap switch 104 is connected to audio selector panel 106 via wire 112 or other coupling means. Remote swap switch 104, when activated, provides a signal to audio selector panel 106 to change the currently selected input to another input. In a preferred embodiment, remote swap switch 104 is a momentary switch and audio selector panel 106 has at least two communication transceiver inputs. When remote swap switch 104 is activated, a signal is provided to audio selector panel 106 to switch from one communication transceiver input to another transceiver input. For example, if two communication transceiver inputs of audio selector panel 106 are called COM1 and COM2, and COM1 is the currently selected input of audio selector panel 106, the activation of remote swap switch 104 will activate a signal via wire 112 to audio selector panel 106 to switch the selected input to COM2. In a similar manner, if COM2 is selected when remote swap switch 104 is activated, audio selector panel 106 will switch the selected input to COM1.

Figure 2:
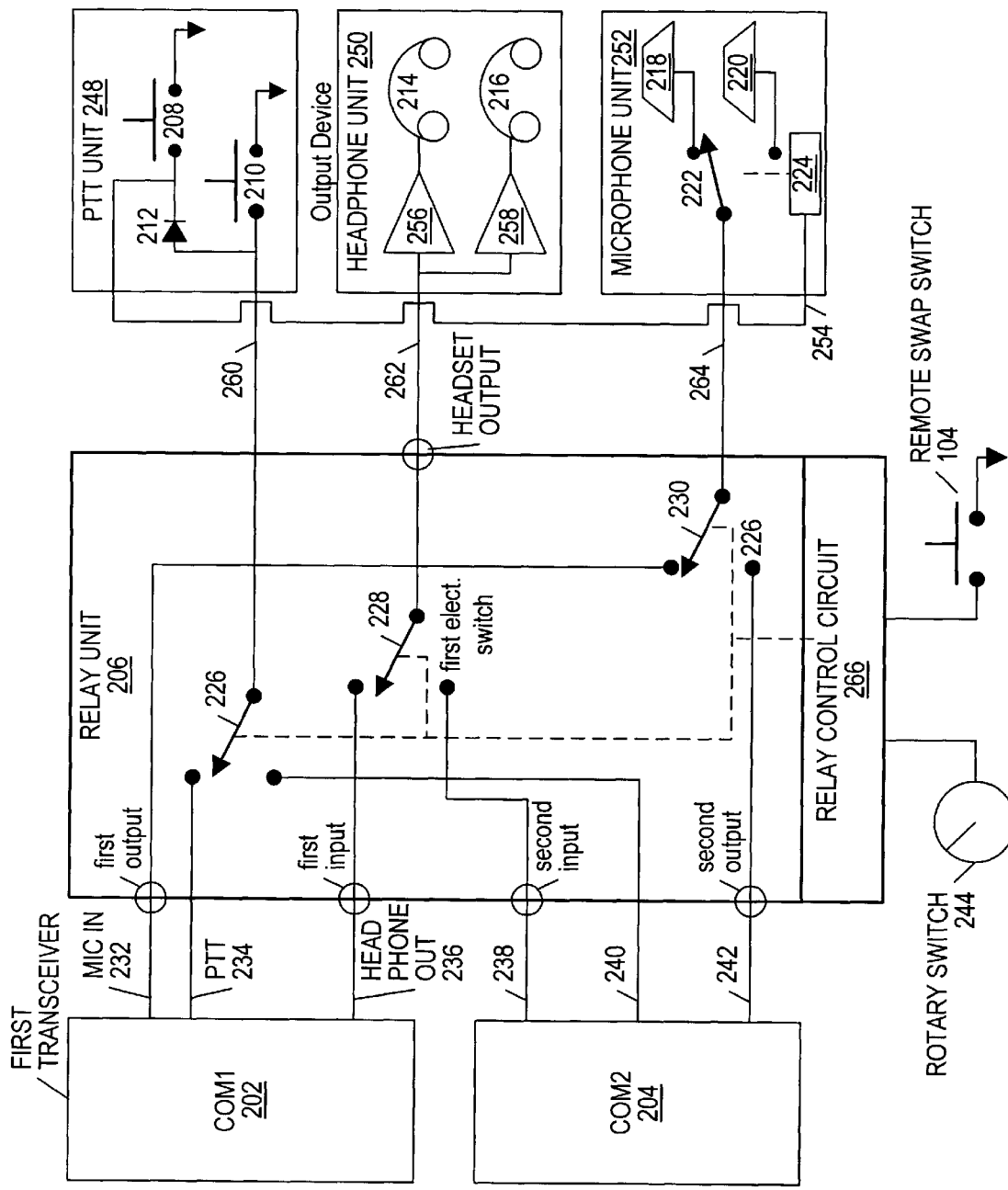
FIG. 2 is a block diagram that illustrates the switching function of an audio selector panel in accordance with the present invention.

FIG. 2 is a block diagram that illustrates a preferred embodiment of the switching function of audio selector panel 106. Circuit portions that correspond to those in FIG. 1 are numbered identically for simplicity and clarity. FIG. 2 illustrates a first communication transceiver (COM1) 202, a second communication transceiver (COM2) 204, a relay unit 206, a push-to-talk (PTT) unit 248, a headphone unit 250, a microphone unit 252, a microphone control line 254, a rotary switch 244, and remote swap switch 104. Relay unit 206 includes relays 226, 228, and 230, and relay control circuit 266. PTT unit 248 includes pilot PTT 210, copilot PTT 208, diode 212, and PTT line 260. Headphone unit 250 includes pilot headphone 214, copilot headphone 216, amplifiers 256 and 258, and headphone line 262. Microphone unit 252 includes pilot microphone 218, copilot microphone 220, relay 222, relay control circuit 224, and microphone line 264. COM1 includes microphone1 line 232, PTT1 line 234, and headphone1 line 236. COM2 includes microphone2 line 242, PTT2 line 240, and headphone2 line 238.

Relay unit 206, via relays 226, 228 and 230, interconnects either COM1 or COM2 with PTT unit 248, headphone unit 250 and microphone unit 252. The position of rotary switch 244 and remote swap switch 104 control the state of relays 226, 228, and 230. Relays 226, 228, and 230 have a common relay control circuit 226. Therefore, relays 226, 228 and 230 are all in the same state and are switched simultaneously. PTT line 260, headphone line 262, and microphone line 264 are either all connected to COM1 202 or COM2 204. In one state, relay 226 connects PTT line 260 to PTT1 line 234, relay 228 connects headphone line 262 to headphone1 line 236, and relay 230 connects microphone line 264 to microphone1 line 232. In another state, relay 226 connects PTT line 260 PTT2 line 240, relay 228 connects headphone line 262 to headphone2 line 238, and relay 230 connects microphone line 264 microphone2 line 242.

Relay control circuit 266 is a circuit that controls the switching of relays 226, 228, and 230. Relay control circuit 226 is controlled by both rotary switch 244 and remote swap switch 104 in a manner as described further below. It is contemplated that a variety of switch types can control relay unit 206. For example, a push button, rotary switch, toggle switch, or other means for making electrical connection can be used.

In the embodiment shown in FIG. 2, when relay unit 206 connects PTT line 260, headphone line 262, and microphone line 264 to COM1, the pilot's headphone 214 and copilot's headphone 216 are connected to COM1, and the pilot's PTT 208 and copilot's PTT 210 are connected to COM1. Although microphone line 264 is also connected to COM1, relay 222 only connects either pilot microphone 218 or copilot microphone 220 to COM1 at one time. Relay 222 prevents the pilot and copilot from transmitting simultaneously. The operation of relay 222 is discussed in more detail below. When relay unit 206 connects PTT line 260, headphone line 262, and microphone line 264 to COM2, the pilot's headphone 214 and copilot's headphone 216 are connected to COM2, and the pilot's PTT 208 and copilot's PTT 210 are connected to COM2. Although microphone line 264 is also connected to COM2, relay 222 only connects either pilot microphone 218 or copilot microphone 220 to COM2 at one time.

Relay 222 controls whether pilot microphone 218 or copilot microphone 220 is connected to microphone line 264, and therefore connected to the communication transceiver selected by rotary switch 244 and remote swap switch 104. The default position of relay 222 is to connect pilot microphone 218 to microphone line 264. When copilot PTT 208 is activated, a control signal is sent to relay control circuit 224 via microphone control line 254 that causes relay 222 to connect copilot microphone 220 to microphone line 264. When pilot PTT 210 is activated, relay 222 remains in its default state and pilot microphone 218 is connected to microphone line 264. If both copilot PTT 208 and pilot PTT 210 are activated, relay 222 will connect copilot microphone 220 to microphone line 264. If there is no power to audio selector panel 104, pilot microphone 218 will be connected microphone line 264.

Diode 212 prevents pilot PTT 210 from sending a signal on microphone control line 254, but allows copilot PTT 208 to send a signal on PTT line 260. Amplifiers 256 and 258 are conventional amplifiers used to boost the signal on headphone line 262 to pilot headphone 214 and copilot headphone 216.

If power is removed from relay unit 206, by either switching audio selector panel 106 off or a power loss, relay unit 206 and relay 222 will connect pilot headphone 214 and copilot headphone 216 to COM1, and connect pilot microphone 218 to COM1. The default state of relays 226, 228 and 230 is to connect PTT line 260, headphone line 262, and microphone line 264 to COM1, and the default state of relay 222 is to connect pilot microphone 218 to microphone line 264.

Figure 3:
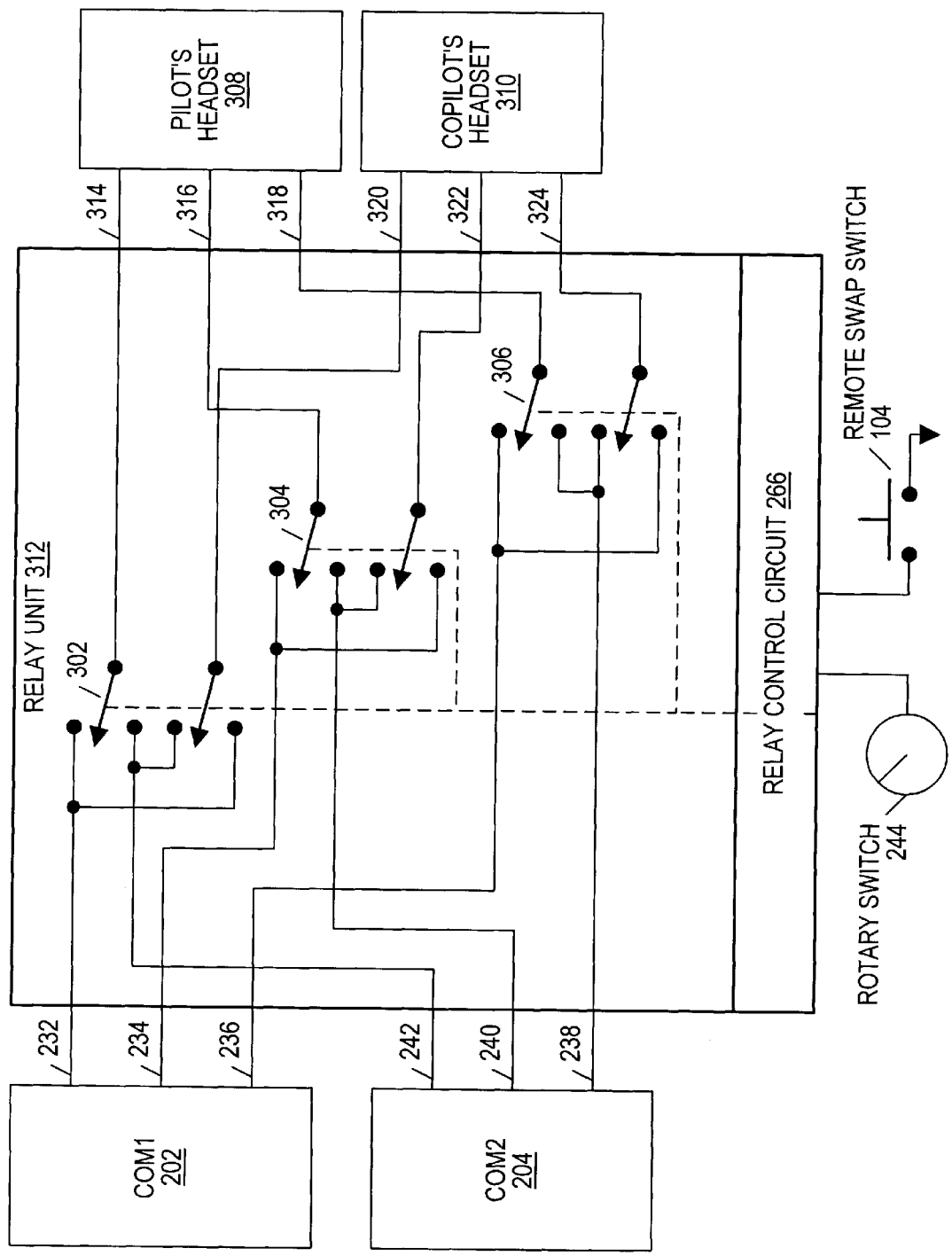
FIG. 3 is a block diagram that illustrates the switching function of an audio selector panel when a pilot and copilot are connected to different communication devices.

FIG. 3 is a block diagram that illustrates the switching function of the audio selector panel when the pilot and copilot are connected to different communication devices. In one embodiment, audio selector panel 106 is configured to connect the pilot to one input device and the copilot to another input device. This mode of operation permits the pilot and copilot to monitor and/or transmit on two different devices simultaneously. For example, the pilot may be connected to COM1 202 and the copilot connected to COM2 204. When remote swap switch 104 is activated in this mode, the pilot is switched to COM2 204 and the copilot is switched to COM1 202.

FIG. 3 includes COM1 202, COM2 204, a relay unit 312, a pilot's headset 308, a copilot's headset 310, rotary switch 244, and remote swap switch 104. Relay unit 312 includes relays 302, 304, and 306, and relay control circuit 266. Pilot's headset 308 includes microphone line 314, PTT line 316, and headphone line 318. Copilot's headset 310 includes microphone line 320, PTT line 322, and headphone line 324.

Relay unit 312 connects either pilot's headset 308 to COM1 202 and copilot's headset 310 to COM2 204, or pilot's headset 308 to COM2 204 and copilot's headset 310 to COM1 202. If pilot's headset 308 is connected to COM1 and copilot's headset 310 is connected to COM2, then relay 302 connects microphone1 line 232 to microphone line 314 and microphone2 line 242 to microphone line 320. Likewise, relay 304 connects PTT1 line 234 to PTT line 316 and PTT2 line 240 to PTT line 322; and relay 306 connects headphone1 line 236 to headphone line 318 and headphone2 line 238 to headphone line 324. If remote swap switch 104 is activated while pilot headset 308 is connected to COM1 and copilot headset 310 is connected to COM2, then relay 302 will change states and connect microphone1 line 232 to microphone line 320 and microphone2 line 242 to microphone line 314; relay 304 will change states and connect PTT1 line 234 to PTT line 322 and PTT2 line 240 to PTT line 316; and relay 306 will change states and connect headphone1 line 236 to headphone line 324 and headphone2 line 238 to headphone line 318. Relay unit 312 operates in a similar manner when pilot's headset 308 is connected to COM2 204 and copilot's headset 310 is connected to COM1 202.

Figure 4:
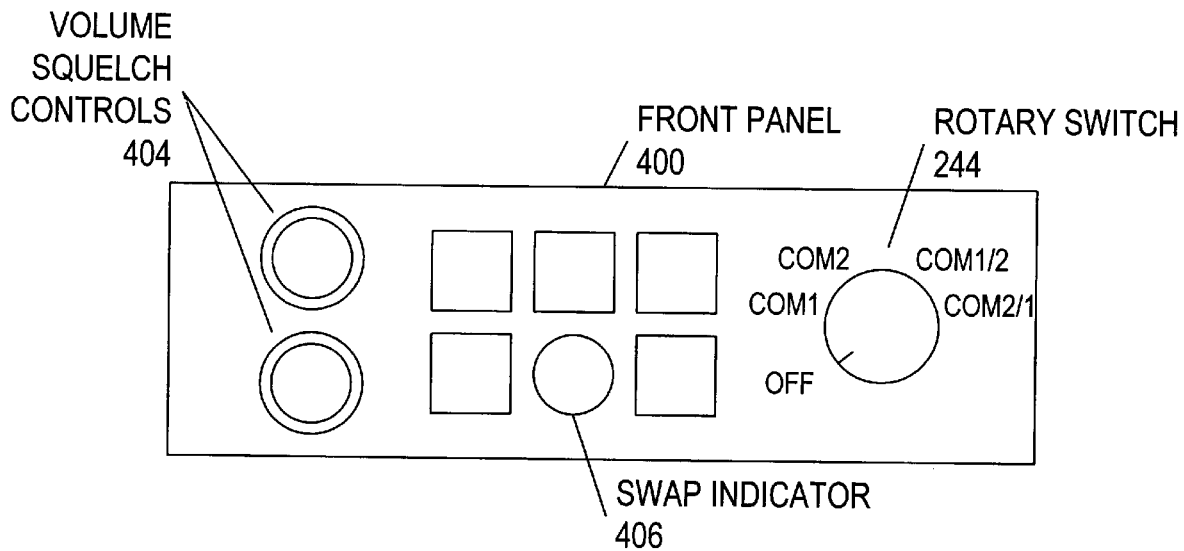
FIG. 4 is a diagram of a front panel of an audio selector panel in accordance with the present invention.

FIG. 4 is a diagram of a front panel 400 of audio selector panel 106. Front panel 400 includes volume/squelch controls 404, swap indicator 406, and rotary switch 244. Volume/squelch controls 404 allow the pilot and copilot to control the volume and adjust the squelch on their respective headsets.

Rotary switch 244 allows the operator to turn audio selector panel 106 on/off and to choose which inputs are connected to the pilot and copilots headsets. In the embodiment shown in FIG. 4, rotary switch 244 can be used to select four modes of operation: COM1, COM2, COM1/2, COM2/1. If rotary switch 244 is turned to COM1, then both the pilot and copilot are connected to COM1. If remote swap switch 104 is activated while in this mode, then both the pilot and copilot will be switched to COM2. If rotary switch 244 is turned to COM2, then both the pilot and copilot are connected to COM2. If remote swap switch 104 is activated while in this mode, then both the pilot and copilot will be switched to COM1. If rotary switch 244 is turned to COM1/2, then the pilot is connected to COM1 and the copilot is connected to COM2. If remote swap switch 104 is activated while in this mode, then the pilot will be switched to COM2 and the copilot will be switched to COM1. If rotary switch 244 is turned to COM2/1, then the pilot is connected to COM2 and the copilot is connected to COM1. If remote swap switch 104 is activated while in this mode, then the pilot will be switched to COM1 and the copilot will be switched to COM2. From any of the above described modes, activating remote swap switch 104 a second time will return audio selector panel 106 to its original mode.

Swap indicator 406 visually indicates that rotary switch 244 is not an accurate indication of the current mode of audio selector panel 106. Swap indicator 406 is controlled by an output of relay control circuit 266. If rotary switch 244 is a manual switch, then when remote swap switch 104 is activated, the current position of rotary switch 244 is not an accurate indication of the current mode of audio selector panel 106. For example, if rotary switch 244 is a manual switch and is turned to COM1, when remote swap switch 104 is activated, audio selector panel 106 will switch to COM2, but rotary switch 244 will still be turned to COM1. Therefore, rotary switch 244 indicates that audio selector panel 106 is in COM1 mode when it is actually in COM2 mode. The operator is warned of this condition by swap indicator 406. Swap indicator 406 is activated when remote swap switch 104 is activated. Swap indicator 406 is deactivated when rotary switch 244 is turned to the current mode of audio selector panel 106, or remote swap switch 104 is activated a second time, thus returning the audio selector panel to its original mode. In one embodiment, swap indicator 406 is an LED. It is contemplated that other types of indicators can be used.

Numerous variations and modifications will become apparent to those skilled in the art once the above disclosure is fully appreciated. It is intended that the following claims be interpreted to embrace all such variations and modifications.

What is claimed is:

1. An aviation audio selector device comprising:
    a first input;
    a second input;
    a communication output device;
    a first switch coupled to said first input, said second input, and said communication output device,
    wherein said first switch connects said communication output device to either said first input or said second input; and
    a remote second switch coupled to said first switch, wherein said remote second switch is configured to change the state of said first switch, and wherein said remote second switch is located in a position where a pilot can activate said remote second switch without removing his hands from a flight control mechanism;
    wherein said first input is configured to receive an output from a first communication transceiver and said second input is configured to receive an output from a second communication transceiver; and
    wherein said communication output device includes a pilot headset and a copilot headset; and
    wherein said first switch connects said first communication transceiver to said pilot headset and said second communication transceiver to said copilot headset; and said remote second switch is configured to cause said first switch to connect said pilot headset to said second communication transceiver; and connect said copilot headset to said first communication transceiver.

2. The audio selector device as recited in claim 1, wherein said remote second switch is mounted on a yoke.

3. The audio selector device as recited in claim 1, wherein said audio selector device further comprises a swap indicator, wherein said swap indicator indicates that said remote second switch has changed the state of said first switch.

4. The audio selector device as recited in claim 1, wherein said first switch is an electrically controlled switch and wherein said remote second switch is a user-operated switch.

5. The audio selector device as recited in claim 4, further comprising a control circuit coupled to said first switch and said remote second switch, wherein said control circuit is configured to generate a control signal for controlling a switching state of said first switch, and wherein said control signal is dependent upon a state of said remote second switch.

6. The audio selector device as recited in claim 5, wherein said further comprising a second user-operated switch coupled to said control circuit, wherein said control signal is further dependent upon a state of said second user-operated switch.

7. The audio selector device as recited in claim 6, wherein said remote second switch is a push button switch.

8. An avionic communication system comprising:
a first communication device;
a second communication device;
a pilot communication device including a pilot headset; and
an audio selector device which includes:
a first input coupled to said first communication device,
a second input coupled to said second communication device,
a communication device output coupled to said pilot communication device,
a first switch coupled to said first input, said second input, and said communication device output;
wherein said first switch connects said communication device output to either said first input or said second input;
a remote second switch coupled to said first switch, wherein said remote second switch is configured to change the state of said first switch, and wherein said remote second switch is located in a position where a pilot can activate said remote second switch without removing his hands from a flight control mechanist:
wherein said first communication device is a first communication transceiver and said second communication device is a second communication transceiver:
a copilot headset coupled to said communication device output of said audio selector device: and
wherein said first switch connects said first communication device to said pilot headset and said second communication device to said copilot headset; and said remote second switch is configured to cause said first switch to connect said pilot headset to said second communication device and connect said copilot headset to said first communication device.

9. The avionic communication system as recited in claim 8, wherein said remote second switch of said audio selector device is mounted on a yoke.

10. The avionic communication system as recited in claim 8, wherein said audio selector device further comprises a swap indicator, wherein said swap indicator indicates that said remote second switch has changed the state of said first switch.

11. The avionic communication system as recited in claim 8, wherein said first switch is an electrically controlled switch and wherein said remote second switch is a user-operated switch.

12. The avionic communication system as recited in claim 11, further comprising a control circuit coupled to said first switch and said remote second switch, wherein said control circuit is configured to generate a control signal for controlling a switching state of said first switch, and wherein said control signal is dependent upon a state of said remote second switch.

13. The avionic communication system as recited in claim 12, further comprising a second user-operated switch coupled to said control circuit, wherein said control signal is further dependent upon a state of said second user-operated switch.

14. The avionic communication system as recited in claim 13, wherein said remote second switch is a push button switch.

15. An aviation audio selector device comprising:
a first input for receiving a first audio output signal of a first communication transceiver;
a first output for providing a microphone audio signal to said first communication transceiver;
a second input for receiving a second audio output signal of a second communication transceiver;
a second output for providing said microphone audio signal to said second communication transceiver;
a headset output for connection to a headset;
a first electrically controlled switch coupled to selectively provide either said first audio output signal or said second audio output signal to said headset output depending upon a control signal;
a second electrically controlled switch coupled to selectively provide said microphone audio signal to either said first output or said second output depending upon said control signal;
a first user-operated switch configured to allow a user to select either said first communication transceiver or said second communication transceiver;
a control circuit coupled to said first user-operated switch and said first and second electrically controlled switches and configured to generate said control signal to control said first and second electrically controlled switches depending upon a user selection set by said first user-operated switch; and
a remote second user-operated switch coupled to said control circuit, wherein said control signal is also dependent upon an activation of said second user-operated switch to allow said user to override said user selection set by said first user-operated switch, whereby upon said activation of said second user-operated switch said first and second electrically controlled switches swap between a selection of either said first communication transceiver or said second communication transceiver.

16. The aviation audio selector device as recited in claim 15 further comprising:
a first visual indicator associated with said first user-operated switch to indicate a current selection of either said first communication transceiver or said second communication transceiver by said first user-operated switch; and
a swap indicator configured to illuminate when said current selection indicated by said first visual indicator is incorrect.

17. The audio selector device as recited in claim 15 wherein said remote second user-operated switch is mounted on a yolk.

18. The aviation audio selector device as recited in claim 15 wherein said remote second user-operated switch is a push button switch.

19. The aviation audio selector device as recited in claim 15 wherein said first electrically controlled switch is a relay.

20. The aviation audio selector device as recited in claim 15 wherein said second electrically controlled switch is a relay.

21. The aviation audio selector device as recited in claim 15 further comprising an audio amplifier coupled between said headset output and said first electrically controlled switch for amplifying a selected one of said first and second audio output signals.

22. The aviation audio selector device as recited in claim 15 further comprising a third electrically controlled switch for selectively providing a push-to-talk signal associated with said headset to either said first communication transceiver or said second communication transceiver depending upon said control signal.

23. The aviation audio selector device as recited in claim 15 wherein said first audio output signal and said second audio output signal are provided simultaneously to said first user-operated switch.

24. The audio selector device as recited in claim 23 wherein said remote second user-operated switch is mounted on a yolk.

25. The aviation audio selector device as recited in claim 15 wherein said first user-operated switch is a rotary switch.

26. The aviation audio selector device as recited in claim 25 wherein said remote second user-operated switch is a push button switch.

27. The aviation audio selector device as recited in claim 15 further comprising a panel upon which said first user-operated switch is mounted, wherein said remote second user-operated switch is remotely situated from said panel.

28. The aviation audio selector device as recited in claim 27 wherein said second electrically controlled switch is a relay.

29. The aviation audio selector device as recited in claim 27 further comprising:
   a first visual indicator associated with said first user-operated switch to indicate a current selection of either said first communication transceiver or said second communication transceiver by said first user-operated switch; and
   a swap indicator configured to illuminate when said current selection indicated by said first visual indicator is incorrect.

30. The audio selector device as recited in claim 29 wherein said remote second user-operated switch is mounted on a yolk.

31. The aviation audio selector device as recited in claim 29 further comprising a third electrically controlled switch for selectively providing a push-to-talk signal associated with said headset to either said first communication transceiver or said second communication transceiver depending upon said control signal.

32. An aviation audio selector device comprising:
   a first input for receiving a first audio output signal of a first communication transceiver;
   a first output for providing a selected microphone audio signal to said first communication transceiver;
   a second input for receiving a second audio output signal of a second communication transceiver;
   a second output for providing another microphone audio signal to said second communication transceiver;
   a pilot headset connection for connection to a pilot headset;
   a copilot headset connection for connection to a copilot headset;
   a first electrically controlled switch coupled to selectively provide either said first audio output signal to said pilot headset connection and said second audio output signal to said copilot headset connection, or said second audio output signal to said pilot headset connection and said first audio output signal to said copilot headset connection, depending upon a control signal;
   a second electrically controlled switch coupled to selectively provide either a pilot microphone audio signal from said pilot headset connection to said first output and a copilot microphone audio signal from said copilot headset connection to said second output, or said pilot microphone audio signal from said pilot headset connection to said second output and said copilot microphone audio signal from said copilot headset connection to said first output, depending upon said control signal;
   a first user-operated switch configured to allow a user to select either said first communication transceiver or said second communication transceiver for connection to said pilot headset connection and the other of said first and second communication transceivers for connection to the copilot headset;
   a control circuit coupled to said first user-operated switch and said first and second electrically controlled switches and configured to generate said control signal to control said first and second electrically controlled switches depending upon a user selection set by said first user-operated switch; and
   a second user-operated switch coupled to said control circuit, wherein said control signal is also dependent upon an activation of said second user-operated switch to allow said user to override said user selection set by said first switch, whereby upon an activation of said second user-operated switch said first and second electrically controlled switches swap between a selection of said first communication transceiver and said second communication transceiver for said pilot headset connection and said copilot headset connection.

33. The aviation audio selector device as recited in claim 32 further comprising a panel upon which said first user-operated switch is mounted, and wherein said second user-operated switch is remotely situated from said panel.

34. The aviation audio selector device as recited in claim 32 further comprising:
   a first visual indicator associated with said first user-operated switch to indicate a current selection by said first user-operated switch; and
   a swap indicator configured to illuminate when said current selection indicated by said first visual indicator is incorrect.

35. The audio selector device as recited in claim 32 wherein said second user-operated switch is mounted on a yolk.

36. The aviation audio selector device as recited in claim 32 wherein said second user-operated switch is a push button switch.

37. The aviation audio selector device as recited in claim 32 wherein said first electrically controlled switch is a relay.

38. The aviation audio selector device as recited in claim 32 wherein said second electrically controlled switch is a relay.

39. The aviation audio selector device as recited in claim 32 further comprising a third electrically controlled switch for selectively providing a push-to-talk signal associated with said pilot headset to either said first communication transceiver or said second communication transceiver depending upon said control signal.

* * * * *